US011336534B2

(12) United States Patent
Turner et al.

(10) Patent No.: US 11,336,534 B2
(45) Date of Patent: *May 17, 2022

(54) NETWORK OPERATION

(71) Applicant: BRITISH TELECOMMUNICATIONS PUBLIC LIMITED COMPANY, London (GB)

(72) Inventors: Michael Turner, London (GB); Alexander Healing, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/562,682

(22) PCT Filed: Mar. 30, 2016

(86) PCT No.: PCT/EP2016/056962
§ 371 (c)(1),
(2) Date: Sep. 28, 2017

(87) PCT Pub. No.: WO2016/156433
PCT Pub. Date: Oct. 6, 2016

(65) Prior Publication Data
US 2018/0091377 A1    Mar. 29, 2018

(30) Foreign Application Priority Data
Mar. 31, 2015   (EP) .................................... 15275102

(51) Int. Cl.
*H04L 12/24* (2006.01)
*H04L 41/142* (2022.01)
(Continued)

(52) U.S. Cl.
CPC ........ *H04L 41/142* (2013.01); *H04L 63/1408* (2013.01); *H04L 63/20* (2013.01); *H04L 41/18* (2013.01)

(58) Field of Classification Search
CPC ....... H04L 41/142; H04L 41/18; H04L 41/22; H04L 63/1408; H04L 63/20;
(Continued)

(56) References Cited

U.S. PATENT DOCUMENTS 5,361,351 A   11/1994  Lenkov et al.
5,822,743 A   10/1998  Gupta et al.
(Continued)

FOREIGN PATENT DOCUMENTS

WO   WO 2012/125137   9/2012

OTHER PUBLICATIONS

International Search Report for PCT/EP2016/056962, dated Jun. 8, 2016, 3 pages.
(Continued)

*Primary Examiner* — Jungwon Chang
(74) *Attorney, Agent, or Firm* — Nixon & Vanderhye P.C.

(57) ABSTRACT

A method of operating a communications network is disclosed. In order to manage a network, it is first necessary to establish the state the network is in. This is difficult in practice because the network operational data stored and transmitted in the network takes a myriad of forms owing to the variety of suppliers and types of network equipment. There is a need to distil that network operational data down to aggregate network operational data which can be taken to provide an indication of the state of the network which is of a manageable size, and to which network management apparatus can react by sending control commands to the network. The problem of generating aggregate network operational data is tackled by identifying the type of each
(Continued)

attribute found in each network operational data item, and classifying the network operational data items in a manner which takes account of the identified types and thus provides network aggregate data which more accurately reflects the operational state of the network. This in turn leads to the network management apparatus controlling the network to operate in a more efficient manner than has hitherto been possible.

24 Claims, 9 Drawing Sheets

(51) Int. Cl.
*H04L 29/06* (2006.01)
*H04L 41/18* (2022.01)

(58) Field of Classification Search
CPC ....... H04L 43/045; H04L 43/04; H04L 67/22; H04L 43/028; H04L 41/0631; H04L 47/823; H04L 63/1441; H04L 63/1433; H04L 63/1458; H04L 63/1416; H04L 47/10; H04L 61/6068; H04W 12/06
See application file for complete search history.

(56) References Cited

U.S. PATENT DOCUMENTS

| | | | |
|---|---|---|---|
| 6,718,320 B1 | 4/2004 | Subramanian et al. | |
| 7,159,237 B2 | 1/2007 | Schneier et al. | |
| 7,999,809 B2 | 8/2011 | Beers et al. | |
| 8,028,337 B1 | 9/2011 | Xu et al. | |
| 8,244,857 B2 | 8/2012 | Jakob | |
| 8,364,141 B1 | 1/2013 | Kateley | |
| 8,504,488 B2 | 8/2013 | Dutta | |
| 8,832,109 B2 | 9/2014 | Ghanea-Hercock | |
| 9,633,073 B1 | 4/2017 | Allen | |
| 10,091,668 B2 | 10/2018 | Kateley | |
| 10,389,641 B2* | 8/2019 | Turner | H04L 41/0631 |
| 2002/0133721 A1* | 9/2002 | Adjaoute | G06Q 20/4016 726/23 |
| 2003/0110398 A1 | 6/2003 | Dacier et al. | |
| 2004/0250124 A1* | 12/2004 | Chesla | G06F 21/552 726/13 |
| 2005/0111367 A1* | 5/2005 | Jonathan Chao | H04L 63/1458 370/235 |
| 2006/0053035 A1 | 3/2006 | Eisenberg | |
| 2006/0116995 A1 | 6/2006 | Bloedorn | |
| 2006/0282425 A1 | 12/2006 | Aggarwal et al. | |
| 2007/0280114 A1* | 12/2007 | Chao | H04L 47/10 370/235.1 |
| 2008/0162533 A1 | 7/2008 | Mount et al. | |
| 2008/0270979 A1 | 10/2008 | McCool et al. | |
| 2008/0291918 A1* | 11/2008 | Turcot | H04Q 3/0087 370/395.3 |
| 2008/0320549 A1 | 12/2008 | Bertino et al. | |
| 2009/0172687 A1* | 7/2009 | Bobak | G06Q 10/06 718/104 |
| 2010/0150008 A1* | 6/2010 | Sohn | H04L 41/22 370/252 |
| 2010/0228854 A1* | 9/2010 | Morrison | H04L 29/00 709/224 |
| 2011/0055373 A1 | 3/2011 | Bnayahu et al. | |
| 2011/0098973 A1 | 4/2011 | Seidman | |
| 2011/0277034 A1* | 11/2011 | Hanson | H04L 63/1433 726/25 |
| 2011/0282861 A1 | 11/2011 | Bergstraesser et al. | |
| 2013/0157688 A1 | 6/2013 | Kateley | |
| 2013/0198022 A1 | 8/2013 | Zhang | |
| 2013/0246422 A1 | 9/2013 | Bhargava | |
| 2013/0275576 A1* | 10/2013 | Hinz | H04L 43/04 709/224 |
| 2013/0304909 A1* | 11/2013 | Pappu | H04L 61/6068 709/224 |
| 2013/0305357 A1* | 11/2013 | Ayyagari | H04W 12/06 726/22 |
| 2013/0318015 A1 | 11/2013 | Dutta | |
| 2014/0129371 A1 | 5/2014 | Wilson | |
| 2015/0047034 A1* | 2/2015 | Burnham | H04L 63/1441 726/23 |
| 2015/0128263 A1 | 5/2015 | Raugas et al. | |
| 2015/0304346 A1* | 10/2015 | Kim | H04L 63/1408 726/23 |
| 2015/0356174 A1 | 12/2015 | Narayana | |
| 2016/0182542 A1* | 6/2016 | Staniford | H04L 63/1416 726/23 |
| 2016/0224631 A1 | 8/2016 | James | |
| 2016/0226944 A1* | 8/2016 | Hsiao | H04L 43/028 |
| 2016/0285707 A1* | 9/2016 | Pawlowski | H04L 43/045 |
| 2018/0091377 A1 | 3/2018 | Turner | |
| 2018/0198718 A1 | 7/2018 | Turner et al. | |
| 2018/0227190 A1 | 8/2018 | Healing | |

OTHER PUBLICATIONS

International Search Report for PCT/EP2016/056959, dated Jun. 14, 2016, 3 pages.
Sean Kandel, Jeffrey Heer, Catherine Plaisant, Jessie Kennedy, Frank van Ham, Nathalie Henry Riche, Chris Weaver, Bongshin Lee, Dominique Brodbeck, and Paolo Buono. 2011. "Research directions in data wrangling: visualizations and transformations for usable and credible data", Information Visualization 10, 4 (Oct. 2011), 271-288. DOI=10.1177/1473871611415994 http://dx.doi.org/10.1177/1473871611415994 (18 pages).
"BT simplifies big data and security challenges with new visualisation service", BT Press Release, Jun. 13, 2012 http://www.btplc.com/news/Articles/Showarticle.cfm?ArticleID=B91EICD4-DF52-4 (2 pages).
"Type Inference", Wikipedia page printed Nov. 7, 2013, http://en.wikipedia.org/w/index.php?title=Type...inference&printable=yes (4 pages).
Boriah, S., Chandola, V., & Kumar, V. (2008). "Similarity Measures for Categorical Data: A Comparative Evaluation" In Society for Industrial and Applied Mathematics—8th SIAM International Conference on Data Mining 2008, Proceedings in Applied Mathematics 130 (pp. 243-254). (Society for Industrial and Applied Mathematics—8th SIAM International Conference on Data Mining 2008, Proceedings in Applied Mathematics 130; vol. 1) (12 pages).
BT Assure Analytics Data Sheet 2012 (3 pages).
BT Assure Log Retention Data Sheet, Aug. 2014 (4 pages).
BT Assure Threat Monitoring Data Sheet 2012 (4 pages).
Cisco IOS NetFlow Version 9 Flow-Record Format, White Paper, May 2011 (14 pages).
Extended European Search Report issued in EP15275102.0 dated Sep. 22, 2015 (7 pages).
Martin Ester, Hans-Peter Kriegel, Jörg Sander, and Xiaowei Xu. 1996. A Density-Based Algorithm for Discovering Clusters, A Density-Based Algorithm for Discovering Clusters in Large Spatial Databases with Noise. In Proceedings of the Second International Conference on Knowledge Discovery and Data Mining (KDD'96), Evangelos Simoudis, Jiawei Han, and Usama Fayyad (Eds.). AAAI Press 226-231 (6 pages).
Mihael Ankerst, Markus M. Breunig, Hans-Peter Kriegel, and Jörg Sander. 1999. "OPTICS: Ordering Points to Identify the Clustering Structure". In Proceedings of the 1999 ACM SIGMOD international conference on Management of data (SIGMOD '99). ACM, New York, NY, USA, 49-60. DOI=http://dx.doi.org/10.1145/304182.304187 (12 pages).
Paul F. Velleman & Leland Wilkinson (1993) "Nominal, Ordinal, Interval, and Ratio Typologies are Misleading", The American Statistician, 47:1, 65-72 (19 pages).
Sarah J. Moody, "Automated Data Type Identification and Localization using Statistical Analysis Data Identification", Master of Science in Computer Science Thesis, Utah State University, 2008 (76 pages).
Stevens, S. S. (Jun. 7, 1946). "On the Theory of Scales of Measurement" Science, vol. 103, No. 2684 677-680 (4 pages).

(56) References Cited

OTHER PUBLICATIONS

Viau, Christophe (Jul. 17, 2012). "Hybrid Visualizations for Data Exploration". Thèse de doctorat électronique, Montréal, École de technologic supérieure (127 pages).
Office Action dated Feb. 9, 2021 issued in U.S. Appl. No. 15/749,151 (18 pgs.).
Office Action dated Jul. 24, 2020 issued in U.S. Appl. No. 15/749,151 (17 pgs.).
Office Action dated May 11, 2020 issued in European Application No. 16 744 783.8 (5 pgs.).
Written Opinion of the ISA for PCT/EP2016/056959, dated Jun. 14, 2016, 8 pages.
International Search Report for PCT/EP2016/068119, dated Sep. 29, 2016, 3 pages.
Office Action dated Sep. 10, 2018 issued in Turner, U.S. Appl. No. 15/563,018, filed Sep. 29, 2017 (15 pages).
Office Action dated Oct. 18, 2019 to Healing dated Oct. 18, 2019 issued in U.S. Appl. No. 15/749,151 (31 pgs).
Adaptive Similarity Metrics in Case-based Reasoning, J. Long, S. Stoecklin, D.G. Schwartz, and M.K. Patel, in proceedings Intelligent Systems and Control—2004.
B. J. Gao and M. Ester, "Turning Clusters into Patterns: Rectangle-Based Discriminative Data Description," Sixth International Conference on Data Mining (ICDM'06), Hong Kong, 2006, pp. 200-211.
C. Long, H. Shen, J. Li and J. Ge, "An SR-ISODATA algorithm for IDS alerts aggregation," 2014 IEEE International Conference on Information and Automation (ICIA), Hailar, 2014, pp. 92-97.
C. Mazzariello, "IRC Traffic Analysis for Botnet Detection." 2008 The Fourth International Conference on Information Assurance and Security, Naples, 2008, pp. 318-323.
European Patent Application 15179437.7—extended European Search Report dated Jan. 18, 2016.
K. Xu, Z. Zhang and S. Bhattacharyya, "Internet Traffic Behavior Profiling for Network Security Monitoring." in IEEE/ACM Transactions on Networking, vol. 16, No. 6, pp. 1241-1252, Dec. 2008.
P. Schroeter, J. Bigün, Hierarchical image segmentation by multi-dimensional clustering and orientation-adaptive boundary refinement, Pattern Recognition, vol. 28, Issue 5, 1995, pp. 695-670.
Saeed Salah, Gabriel Maciá-FernáNdez, and JesúS E. DíAz-Verdejo. 2013, Survey A model-based survey of alert correlation techniques. Comput. Netw. 57, 5 (Apr. 2013), 1289-1317.
U.S. Appl. No. 15/563,018, filed Sep. 29, 2017 (45 pages).
U.S. Appl. No. 15/749,151, filed Jan. 31, 2018 (39 pages).
Office Action dated Apr. 1, 2021 issued for European Application No. 16 717 108.1 (7 pages).
U.S. Appl. No. 15/562,682, filed Sep. 28, 2017, Network Operation.
U.S. Appl. No. 15/749,151, filed Jan. 31, 2018, Network Operation.

\* cited by examiner

|   | 120 | 122 | 124 | 126 | 128 | 130 | 132 | 134 |
|---|---|---|---|---|---|---|---|---|
| A | 03/01-17:18:16.81 | 408 | ICMP Echo Reply | 3 ICMP | 5.5.5.3 | 5.5.5.2 | 137 |
| B | 03/01-17:29:10.24 | 19274 | PDF with Flash over smtp | 1 TCP | 1.1.1.44 | 5.5.5.3 | 66 |
| C | 03/01-17:29:10.26 | 19274 | PDF with Flash over smtp | 1 TCP | 5.5.5.3 | 10.0.0.3 | 90 |
| D | 03/01-17:29:11.16 | 19274 | PDF with Flash over smtp | 1 TCP | 1.1.1.42 | 5.5.5.3 | 113 |
| E | 03/01-17:29:11.18 | 19274 | PDF with Flash over smtp | 1 TCP | 5.5.5.3 | 10.0.0.3 | 81 |
| F | 03/01-17:29:21.18 | 19274 | PDF with Flash over smtp | 1 TCP | 1.1.1.49 | 5.5.5.3 | 111 |
| G | 03/01-17:29:21.20 | 19274 | PDF with Flash over smtp | 1 TCP | 5.5.5.3 | 10.0.0.3 | 109 |
| H | 03/01-17:50:54.07 | 384 | ICMP PING | 3 ICMP | 5.5.5.2 | 5.5.5.3 | 68 |
| I | 03/01-17:50:56.16 | 384 | ICMP PING | 3 ICMP | 5.5.5.2 | 5.5.5.3 | 65 |
| J | 03/01-18:02:58.60 | 408 | ICMP Echo Reply | 3 ICMP | 5.5.5.3 | 5.5.5.2 | 68 |
| K | 03/01-18:03:01.10 | 408 | ICMP Echo Reply | 3 ICMP | 5.5.5.3 | 5.5.5.2 | 65 |

Figure 4

NETWORK OPERATION

This application is the U.S. national phase of International Application No. PCT/EP2016/056962 filed 30 Mar. 2016, which designated the U.S. and claims priority to EP Patent Application No. 15275102.0 filed 31 Mar. 2015, the entire contents of each of which are hereby incorporated by reference.

BACKGROUND AND SUMMARY

The present invention relates to the management of a communications network. It has particular utility in dynamic network intrusion monitoring, detection and response.

In order to enable a network to react automatically to a cyberattack or fault (or other unpredictable network event), it is useful to classify digital items, and thereafter provide a common reaction to a class of digital items which are in fact symptomatic of the same underlying network problem.

US Patent application 2015/0047034 discloses the analysis of executable content across an enterprise network. Characteristics of the executable content are found, and sets of characteristics may be grouped according to related content.

In addition to carrying user communications, modern communication networks store and transmit a great deal of data which relates to the operation of the network. That data provides a representation of the operational state of the network which can be processed to reveal the advent of a cyberattack or a network fault. Classifying network operational data items enables the provision of a common reaction to a class of network operational data items which in turn improves the efficiency of the operation of the network.

Because there are a myriad of management functions which need to be performed in a modern communications network, and since those functions are in practice performed by equipment provided by various equipment manufacturers at various times over the past several decades, the network operational data is, in practice, found in a variety of different forms.

Network operational data items are typically characterised by a plurality of attributes, each of which might be said to represent one dimension of the data item. Each network operational data item will give a value for each of the plurality of attributes.

The accuracy of the classification of network operational data items is improved if the data type of one or more attributes of the network operational data items is taken into account during the classification process.

Given the need to react automatically to an unpredictable network event, and at the same time take advantage of the improved classification offered by type-dependent processing, it follows that there is a need for a way of automatically inferring the type of the values given for each attribute in a set of network operational data items. In other words, there is a need for an automatic type inference technique for network operational data which does not rely on a human administrator to identify the data type associated with each attribute of the network operational data items. Furthermore, the disparate nature of network operational data means that such automatic detection cannot, in practice, rely on the data type being explicitly declared in association with the values.

According to a first aspect of the present invention, there is provided a method of operating a communications network comprising:

receiving a plurality of network operational data items relating to the operation of said communications network, each of those network operational data items comprising one or more attributes, each attribute comprising a value for that attribute;

processing a plurality of the values for at least one of said attributes to identify one or more collective properties of said plurality of values and thereby identify the data type of said attribute;

classifying said network operational data items into a plurality of classes using type-specific processing which depends upon the identified data type of said at least one attribute; and automatically applying common treatment in response to network operational data items in one or more of said plurality of classes.

By receiving a plurality of network operational data items, each comprising one or more attributes, each attribute comprising a value for that attribute, and processing a plurality of values for at least one of the attributes to identify one or more collective properties of said plurality of values and thereby identify the data type of said attribute, thereafter using that data type identification in classifying said network operational data items into a plurality of classes, and automatically applying common treatment in response to network operational data items in one or more of the plurality of classes, a method of network operation is provided which is able to efficiently treat an underlying problem in the network in spite of the huge number of network operational data items generated by that problem.

Examples of common treatment include giving the network elements, traffic or events represented by network operational data items assigned to the same class, the same level of priority, or where the network elements, traffic or events are malicious, handling them with the same countermeasure. It is to be understood that the treatment applied is common to the class, but differs between classes. In other words, common class-specific treatment is applied to the class.

Collective properties of the set of values for an attribute include:

i) the highest ranked data type which matches all of the values in the set of values given for that attribute, where an example ranking of data types gives the highest ranking to specialist data types, and the lowest ranking to general data types;

ii) the number of unique values found in the plurality of values;

iii) the distribution of those values;

iv) the distribution of the differences between the values when ordered;

v) the mean of the values.

Collective properties iii) to v) can only be found for quantitative attributes.

In some embodiments, the identified data types are statistical data types. Each different statistical data type has a different set of collective operations which can sensibly be applied to them.

In some embodiments, the method further comprises comparing said plurality of values to one or more specialised patterns in order to identify the type of the attribute to be a specialist data type. This is particularly beneficial in refinements of these embodiments, in which a user is able to specify operations which can sensibly be applied to the specialist data type. In some cases, the method further includes receiving a specification of a specialist data type, and/or a specification of one or more operations which are tailored to that specialist data type.

According to a second aspect of the present invention, there is provided a network control apparatus comprising:

a receiver arranged in operation to receive a plurality of network operational data items relating to the operation of said communications network, each of those network operational data items comprising one or more attributes, each attribute comprising a value for that attribute;

a data type identifier arranged in operation to process a plurality of the values of at least one of said attributes to identify one or more collective properties of said plurality of values and thereby identify the type of the values of said attribute;

a network operational data item classifier arranged in operation to classify said network operational data items into a plurality of classes using type-specific processing which depends upon the identified data type of said at least one attribute; and a network controller arranged in operation to automatically apply common treatment in response to network operational data items in one or more of said plurality of classes.

According to a third aspect of the present invention, there is provided a computer-implemented method of automatically inferring the type of data present in at least one dimension of a network operational data item comprising:

receiving a plurality of network operational data items relating to the operation of said communications network, each of those network operational data items comprising one or more attributes, each attribute comprising a value for that attribute; and processing a plurality of the values of at least one of said attributes to identify one or more collective properties of said plurality of values and thereby identify the type of said attribute.

By operating a computer to receive a plurality of network operational data items, each of those network operational data items comprising one or more attributes, each attribute comprising a value for that attribute, and thereafter process a plurality of the values given for at least one attribute to identify one or more collective properties of said plurality of values and thereby identify the type of said attribute, a method of automatically inferring the type of one or more attributes of the network operational data items is provided. This enables the complete automation of network management processes which comprise a type inference process step.

It is to be understood that the type of the attribute is the type of the values given for that attribute.

BRIEF DESCRIPTION OF THE DRAWINGS

There now follows, by way of example only, a description of one or more embodiments of the invention. This description is given with reference to the accompanying drawings, in which:

FIG. 4 shows an example of network operational data;

DETAILED DESCRIPTION OF PRESENT EXAMPLE EMBODIMENTS

In a first embodiment, a network security system (FIG. 1) is used to deploy and provide a managed security service that monitors a customer's network activity using a customer network management node 20 which collects status data from monitored components and transmits that status data to a secure operations centre 40 ("SOC").

The managed security service is not intended to replace but to supplement, and thereby render more effective, a customer's existing preventive security products. Such products, which can include firewalls, servers, routers, intrusion detection systems, and other security products, can generate millions of lines of audit information each day. Buried in all that information may be the footprints of ongoing network attacks or intrusions. The managed security service can help filter and analyze all of that audit information in real time to detect and then counter such attacks or intrusions.

Figure 1:
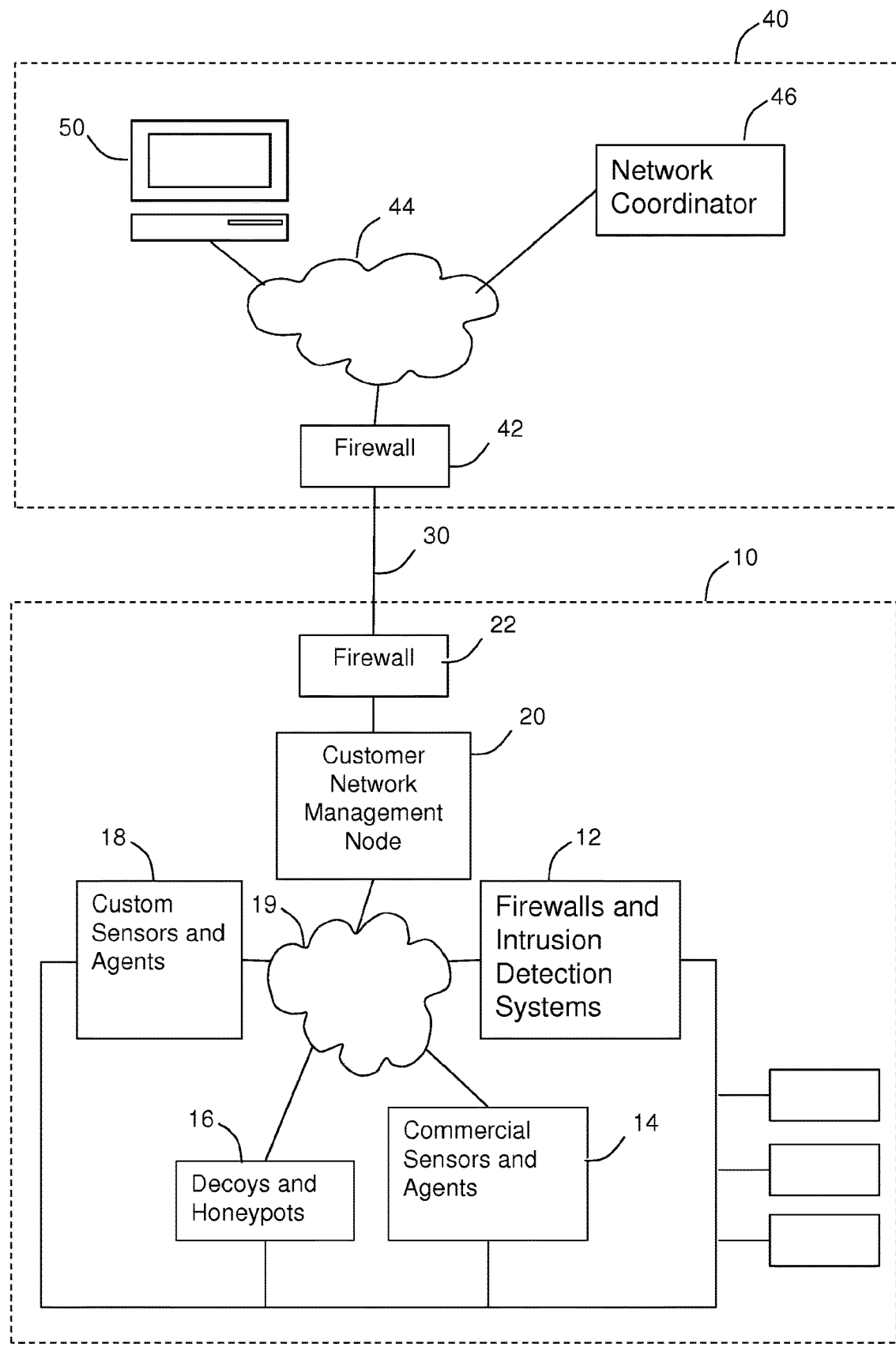
FIG. 1 shows a corporate network monitoring system according to an embodiment of the present invention.

FIG. 1 is an overview of the systems deployed to provide a managed security service. FIG. 1 is divided into two portions; components and systems that operate on the customer site 10 (that is, within the customer's firewall 22) and components and systems that operate within the SOC 40 (that is, within the SOC firewall 42). A single SOC can monitor and service multiple customer sites, and a single customer site can be monitored by multiple customer network management nodes. For ease in understanding, this discussion assumes a single SOC servicing a single customer site being monitored by a single customer network management node.

Customer network management node 20 monitors sensors attached to customer network 10 for evidence of potential security-related events happening on network 10. Such sensors can include firewalls and intrusion detection systems 12, commercially available sensors and agents 14, decoys and honeypots 16 (monitored devices or programs designed to attract the attention of, and thereby expose, a would-be intruder), and custom sensors and agents 18. More generally, customer network management node 20 can monitor and collect information from any network component that can be configured to send or provide to it status data (including audit log data and other audit information) concerning the status of network 10 and its components.

Both sensors and agents can monitor network components. However, while typically a sensor passively receives status data from network components set up to send such data to the sensor, an agent is designed to actively seek such data from the components it is monitoring. Sensors may include scanning engines, syslog data providers (including devices such as routers and firewalls), Simple Mail Transfer Protocol ("SMTP") sensors, Simple Network Management Protocol ("SNMP") sensors and SNMP traps. SNMP sensors generally require polling and may require additional software provided as part of the managed security service, whereas SNMP traps generally send data directly, without prompting. Sensors and agents may be customized for the particular needs of a customer's network, for example, to provide information not provided by those sensors and agents that are commercially available.

Customer network management node 20 collects the constantly updated status data it receives from sensors and agents, and provides it to the security operations centre 40 for analysis (e.g., cross-customer analysis). As will be explained below, the customer network management node 20 may be updated during actual operation with network management policies or rules. Such updates can be sent from the SOC 40 to the customer network management node 20 and signed, verified and then securely installed. The updates can be controlled by network coordinator 46 within SOC 40.

The communications link 30 provides an encrypted, secure communications path and message protocol for messages sent back and forth between customer network management node 20 at the SOC 10. The communications protocol used over communications link 30 preferably runs inside a Transport Layer Security ("TLS") session or other protected path. Either side can send individual messages containing identification information and a payload.

The security operations centre 40 comprises a network coordinator 46, a firewall 42 and a network management console 50, all of which are interconnected via internal network 44. The network management console 50 provides an interface allowing a security analyst to interact with the network coordinator 46. The firewall 42 receives the communication link 30 from the customer network 10.

Figure 2:
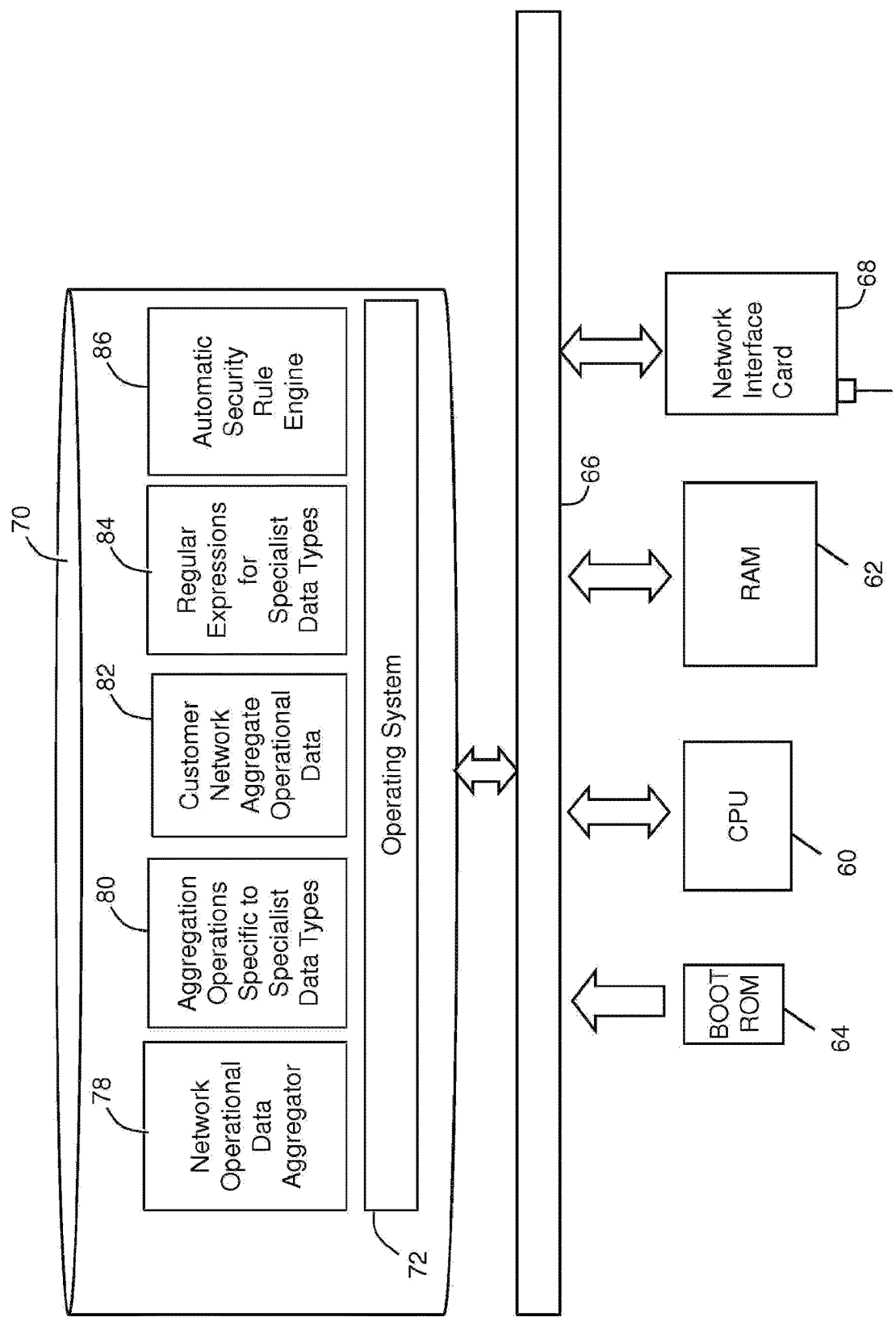
FIG. 2 shows the architecture of a network coordinator in the embodiment.

The network coordinator 46 comprises (FIG. 2) a central processing unit 60, a volatile memory 62, a read-only memory (ROM) 64 containing a boot loader program, and writable persistent memory—in this case in the form of a hard disk 70. The processor 60 is able to communicate with each of these memories via a communications bus 66.

Also communicatively coupled to the central processing unit 60 via the communications bus 66 is a network interface card 68. The network interface card 68 provides a communications interface between the network coordinator 46 and the internal network 44. Thus, the network interface card 68 provides a communications interface between the network coordinator 46, and, via the firewall 42 and the communications link 30, the customer network 10.

The hard disk 70 of the network coordinator 46 stores an operating system program 72, a network operational data aggregator 78, to which aggregation operations specific to specialist data types 80 can be added. The operation of the data aggregator will be explained below with reference to FIGS. 5 to 8. The aggregate data for each customer network generated by the network operational data aggregator 78 is stored as customer network aggregate operational data 82. Also stored on the hard disk 70 is a file 84 storing regular expressions and identifiers of corresponding specialist data types. Finally, the hard disk 70 also stores an automatic security rule engine 86. The operation of the automatic security rule engine 86 will be explained below with reference to FIG. 9.

Figure 3:
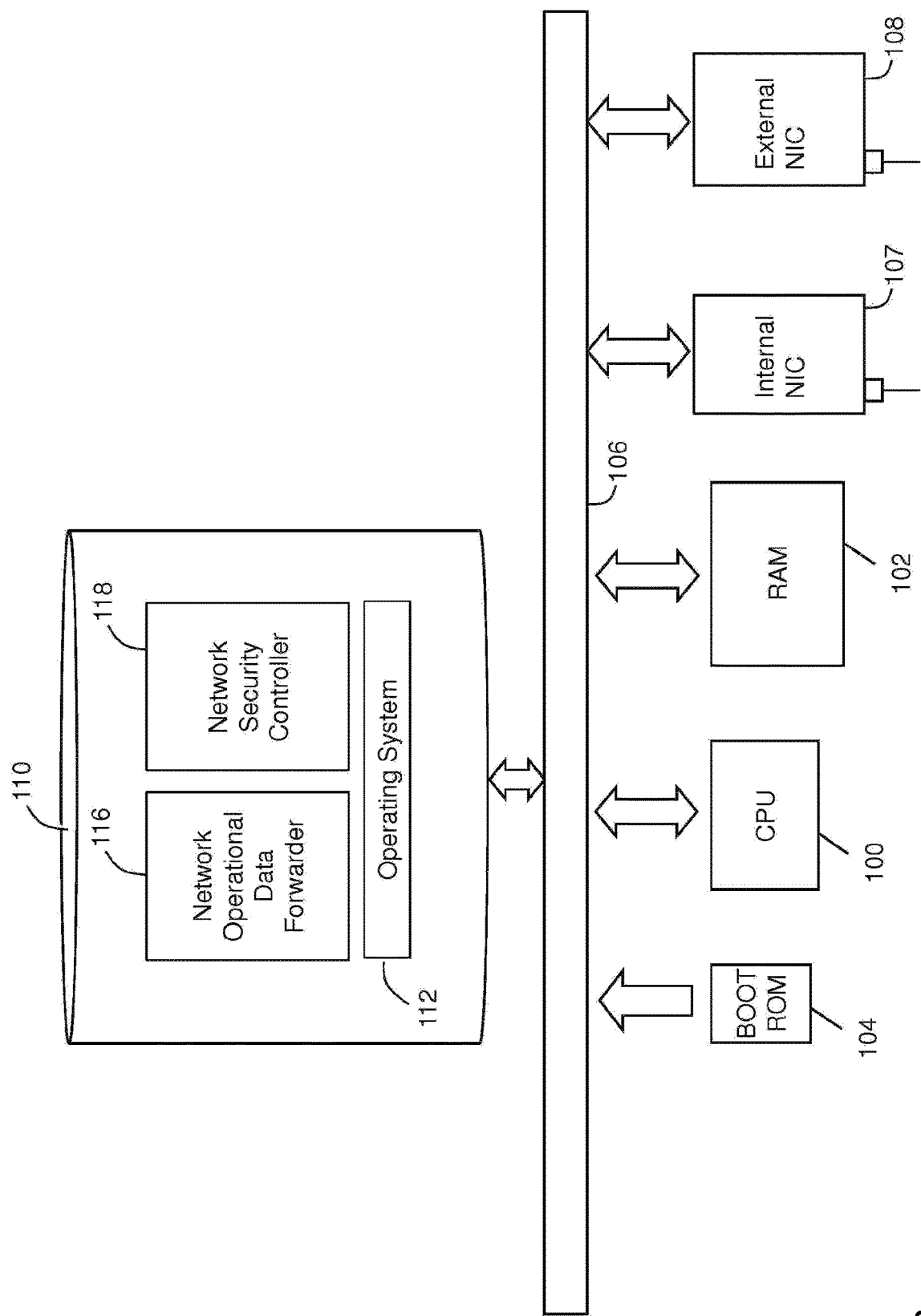
FIG. 3 shows the architecture of a customer network management node in the embodiment.

Turning now to the customer network 10, the customer network management node 20 comprises (FIG. 3) a central processing unit 100, a volatile memory 102, a read-only memory (ROM) 104 containing a boot loader program, and writable persistent memory—in this case in the form of a hard disk 110. The processor 100 is able to communicate with each of these memories via a communications bus 106.

Also communicatively coupled to the central processing unit 100 via the communications bus 106 are internal and external network interface cards 107, 108. The internal network interface card 107 provides a communications interface between the customer network management node 20 and the internal communications network 19. The external network interface card provides a communications interface between the customer network management node 20, and, via the firewall 22 and communications link 30, the security operations centre 40.

The hard disk 110 of the customer network management node 20 stores an operating system program 112, a network operational data forwarder 116, and a network security controller 118.

As will be explained below with reference to FIG. 9, network security controller 118 can process and execute requests originating from the security operations centre 40 designed to mitigate or terminate various attacks. For example, in reaction to a control message from the network coordinator 46 in the security operations centre 40, the network security controller 118 might issue a rule update to the customer's firewalls 12 causing them to prevent any access to the customer's network from an IP address specified in the updated rule, for an amount of time specified in the updated rule.

An example set of network operational data records (A-K) which might be received by the customer network management node 20 is illustrated in FIG. 4. Each record has a given number of attributes, dimensions or fields (in this example eight) (120-134). As will be understood by those skilled in the art, the data will comprise a sequence of bytes representing a sequence of characters (the characters might, for example, be encoded using the UTF-8 character encoding standard). The characters will typically include special field delimiter and record delimiter characters which indicate the boundaries between fields and records. The fields themselves will typically comprise a sequence of characters. Sometimes, the data will not include any indication of the meaning of the various character sequences found in each field. In such cases, this embodiment is nevertheless able to generate useful aggregate network operational data from the network operational data records. Similarly, this embodiment can generate useful aggregate network operational data in cases where an indication of the meaning of the various character sequences is accessible, but without requiring a developer to alter the network operational data aggregator each time a new source of network operational data is to be ingested into the network operational data aggregator.

The network operational data forwarder 116 is arranged to receive or gather network operational data records from administrator-specified sources 12-18 within the customer network 10, and forward them to the network coordinator 46 via the communications link 30.

Figure 5:
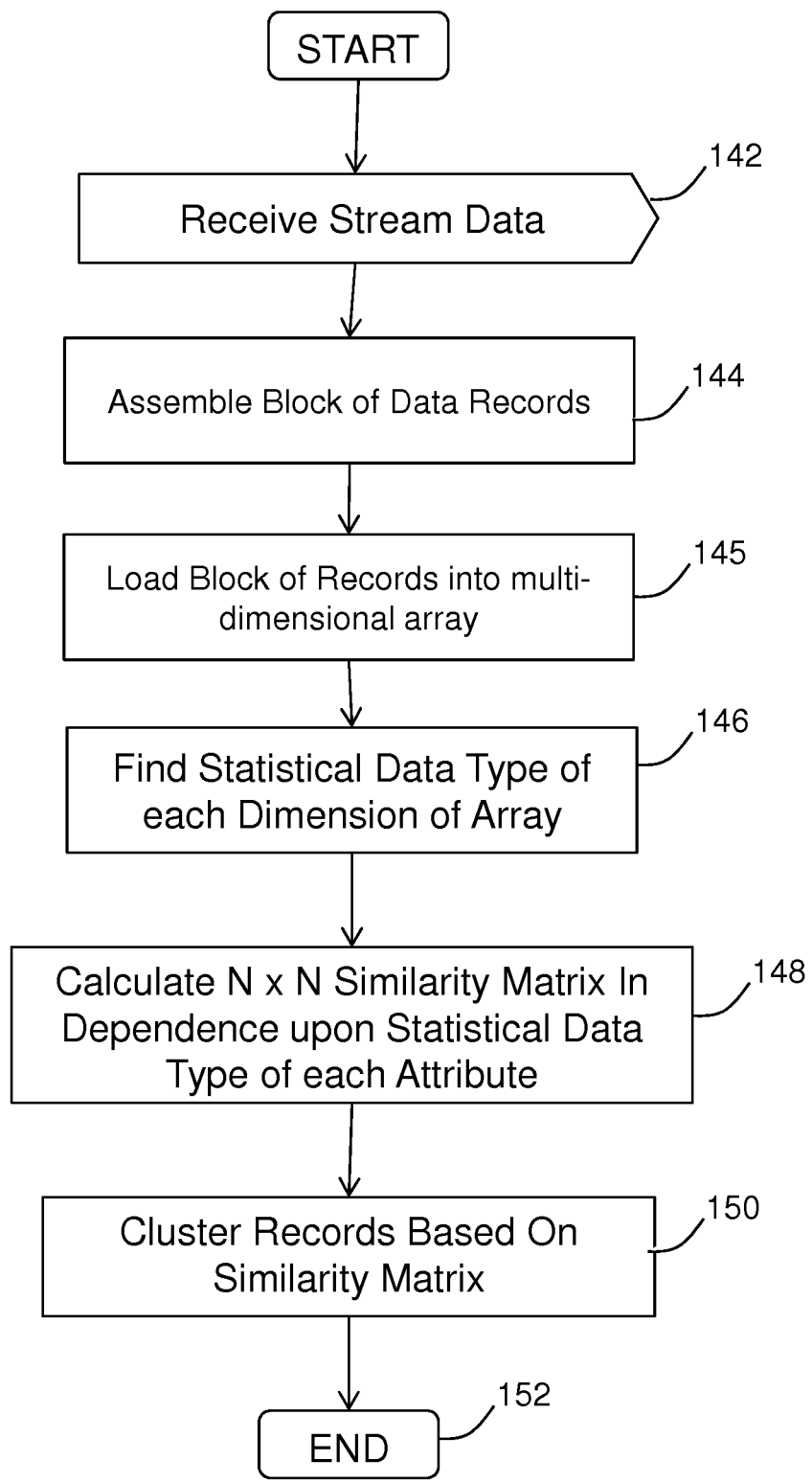
FIG. 5 is a flowchart illustrating a data aggregation process run by the network coordinator of FIG. 2.

The operation of the network operational data aggregator 78 will now be described with reference to FIG. 5. The network coordinator 46 receives 142 the network operational data, identifies the record delimiter values in the data stream, and thereby assembles 144 the input data stream into blocks of records. The number of records (N) in each block is chosen to provide a sufficiently large sample of the possible values for each of the fields of the records to provide a desired degree of certainty of the statistical data type or data type of each attribute.

Having assembled a block of records, the field delimiters in the data are identified and the block of records loaded 145 into an array with the same number of dimensions as the data. In other embodiments, only a subset of the dimensions of each record might be loaded in the array (for example, the dimensions chosen might be those considered most useful for generating meaningful clusters of records). In some embodiments, dimensions might be added to each record—e.g. a record identifier, and an identifier of the customer network which contains the device which generated the record. The array will then have a number of rows N, each row having a number of fields (M) following selection and/or addition of fields.

The values in each dimension of the M×N array are then analysed 146 to find a most probable statistical data type of each dimension of the array.

Various classifications of statistical data types are known in the art. One refers to statistical data types as 'scales of measure' and categorises a set of data as being 'nominal', 'ordinal' or 'quantitative'. 'Quantitative' data can in turn be further categorised into 'interval' type data or 'ratio' type data.

Sets of nominal data cannot be meaningfully ordered. For example, the magnitude of a TCP port number in a flow record is of no significance—each TCP port number could be replaced with an arbitrarily chosen name—hence TCP port numbers are a nominal data type.

By contrast, sets of ordinal data do have an inherent order. For example, the severity of a syslog message can have seven values as follows:

| Code | Severity | Description |
| --- | --- | --- |
| 0 | Emergency | System is unusable |
| 1 | Alert | Action must be taken immediately |
| 2 | Critical | Critical conditions |
| 3 | Error | Error conditions |
| 4 | Warning | Warning conditions |
| 5 | Notice | Normal but significant condition |
| 6 | Informational | Informational messages |
| 7 | Debug | Debug-level messages |

It should be noted that the values in both the 'code' column in the above table, and the values in the 'severity' column are examples of ordinal data. It will be understood then by those skilled in the art that the statistical data type, or statistical data type, of a set of data values relates to what the data is representing, rather than representing how the data is stored.

Sets of quantitative data go beyond ordinal data in that, in addition to having an inherent order, the numerical difference between different values has meaning too. For example, the IN_BYTES field of a Cisco 105 NetFlow Version 9 record is a numerical value representing the number of bytes associated with an IP flow. Since the difference between, say a 100 byte flow and an 80 byte flow is the same as the difference between a 40 byte flow and a 20 byte flow, such data is an example of quantitative data.

Finding the statistical data type of a given attribute of the data is useful because it determines which operations produce useful results from the values given for that attribute. There is often an inverse relationship between how many different types of data an operation is applicable to, and the utility of the output of that operation. Such operations include statistical operations. For example, well-known measures of central tendency of a set of data offer a trade-off between utility of the measure and the applicability to different scales of measure. The arithmetic mean is the most informative measure of central tendency available for quantitative data, but cannot be applied to non-numeric ordinal or non-numeric nominal data. Even when applied to numeric nominal data, the results are usually meaningless (e.g. the arithmetic mean of a set of TCP port numbers is not useful aggregate information). The median can be applied to both quantitative and ordinal data (it is of wider applicability), but is of less utility as a measure of central tendency for quantitative data. The mode can be applied to quantitative, ordinal or nominal data, but is the least informative measure of central tendency for quantitative data sets.

In addition to the above-listed scales of measure, the present embodiment allows a user to store regular expressions 84 which match specialist data types into the network coordinator. For example, a user might add a regular expression "\b(?:(?:25[0-5]12[0-4][0-9]|[01]?[0-9][0-9]?)\.){3} (?:25[0-5]12[0-4][0-9]|[01]?[0-9][0-9]?)\b" as being an IPv4 address. The present embodiment also allows a user to provide a programmatic description 86 of an operation which might be performed on the data of a given type. For example, a description of the calculation of a measure of the similarity between two IPv4 addresses might be provided by the user along with a regular expression enabling the recognition of an IPv4 address.

Other possible examples of specialist data types include commonly used date/time formats. Furthermore regular expressions matching data types important to a particular domain, can be provided along with specialist operations which apply to the domain-specific data types. It will be understood that the advantage of recognising a new data type comes not only from recognising the actual data type but from using that knowledge to better analyse the data. For example, a distance metric uniquely designed for IP addresses might be provided along with a regular expression for the IP address type in order to provide a more useful distance metric to use when clustering the data. Without the identification of IP addresses the correct distance metric would not be applied and hence the clustering would not accurately reflect a true classification of the records. As will be described below with reference to FIG. 7, identifying the data type of a value involves applying a pipeline of data type checks, and specialist data type checks can be straightforwardly added to or removed from that pipeline. Recognition of an IP address data type is an example of a specialist data type check which might be added to such a pipeline.

Figure 6:
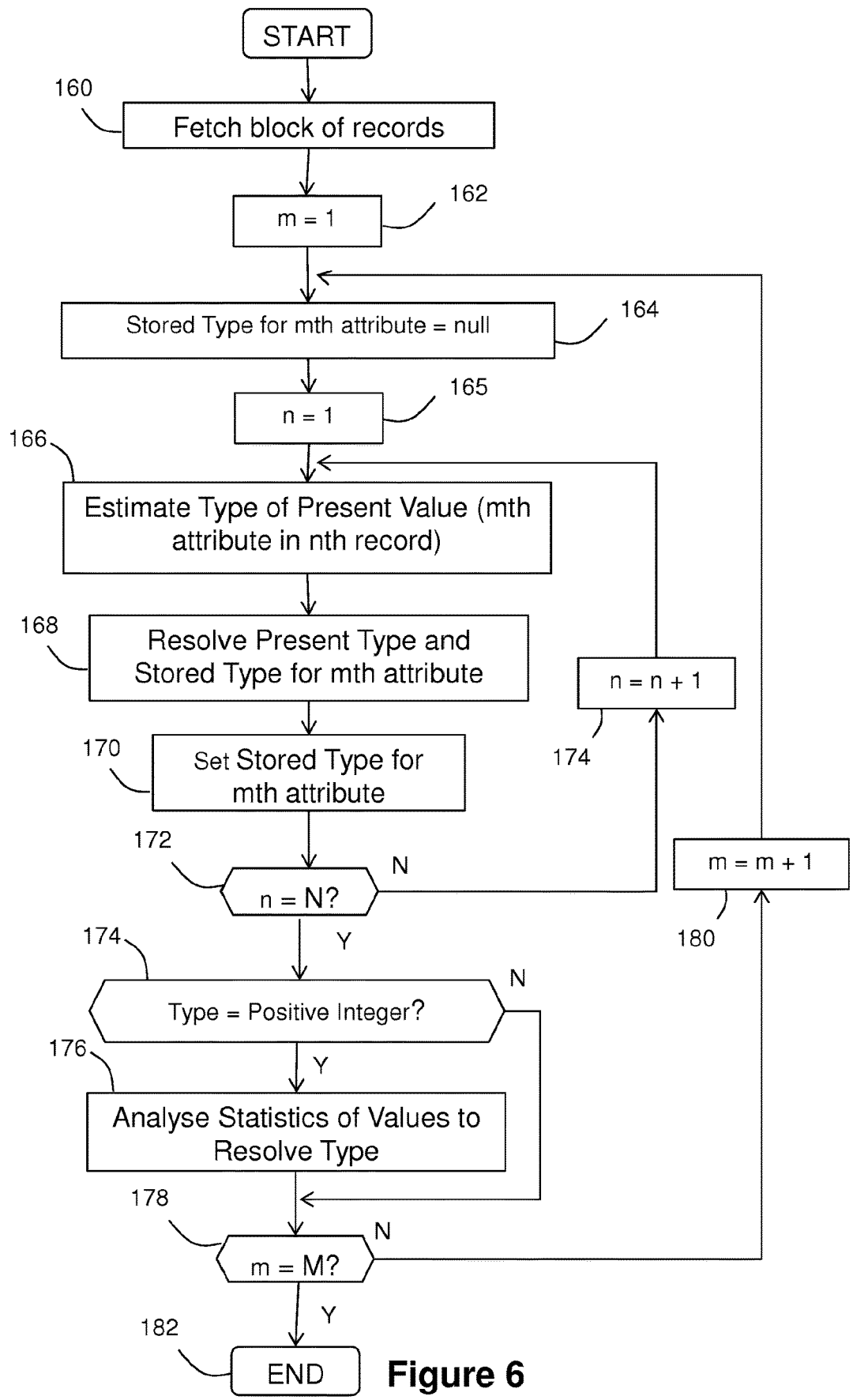
FIG. 6 is a flowchart illustrating how the statistical data type of each attribute of the network operational data records is found.

The step of finding the statistical data type of each attribute of the block of data records will now be described in more detail with reference to FIGS. 6 to 8.

The process (FIG. 6) for finding the statistical data type of each attribute of the block of records starts with the input 160 of a block of N records. Thereafter an outer loop of instructions (164-178) is repeated for each of the M attributes in each record. Within each iteration of the outer loop of instructions (i.e. for each attribute), an inner loop of instructions (166-172) is repeated for each of the N values of the current attribute to identify the statistical data type of the current attribute. Should a test 174, which follows the inner loop of instructions (166-172), find that the values of the current attribute are positive integers, then a further process 176 is carried out to find the statistical data type of the attribute in question.

The operation of the inner loop of instructions (166-172) will now be explained with additional reference to FIG. 7. The nth iteration of the inner loop of instructions (166-172) takes the value (of the mth attribute) in the nth record and applies a decision tree (FIG. 7) to decide the type of the value currently being considered. Those skilled in the art will be able to provide code executable to apply the decision tree of FIG. 7. In the present embodiment, the decision tree is implemented as a pipeline of processes. The top of the decision tree is a specialist type check 190 which attempts to match the current value to any of the predefined specialist types stored at the network coordinator 46. So, for example, the check might find that the value of the mth attribute of the nth record matches the structure of an IP address and would therefore set the type for the current value to "IPAD-DRESS". If the value does not match any specialist type, then a number test 194 finds whether the value is numeric or non-numeric. If the value is non-numeric, the value is taken 196 to be a nominal value. If the value is numeric, then one or more further tests are performed to establish the type of the numeric value. If the numeric value is found to include one period character (test 198) or is preceded by a minus sign (test 202), then the value is taken to be quantitative, otherwise it is considered to be a positive integer.

Having classified 166 the current value of the current attribute as being:

a) a specialist type;
b) a nominal type;
c) a quantitative type; or
d) a positive integer type, a type resolution step 168 resolves any discrepancy between the currently stored type for the mth attribute and the identified type for the nth value of the mth attribute.

In the type resolution step 168, the currently stored type for the current attribute is compared with the identified type for the current value, and the stored type for the current attribute is set 170 to the lower type according to the following ranking:

Specialist Data Type>Positive Integer>Quantitative>Nominal

Once the inner loop of instructions (166-172) has ended (i.e. all the values of the mth attribute have been considered), a test 174 is performed to find whether the stored type for the current attribute is the positive integer type.

In an alternative embodiment, once a nominal value has been identified, the inner loop of instructions might be terminated before all the values of the mth attribute have been considered, since, given the above ranking, the stored type for the current attribute will then necessarily be found to be nominal.

If, the stored type for the current attribute is the positive integer type, then a statistical analysis 176 of the values given for the current attribute is performed. That analysis applies a further decision tree (FIG. 8) to find the statistical data type of the attribute. In a top-level test 210, the distribution of the values is analysed to find whether they contain fewer than twelve unique values. If they do, then the values are ranked and the differences between successive values in the ranked list of values are found, and the distribution of those differences is calculated 212. If that distribution has a low standard deviation, then the statistical data type of the current attribute is found 214 to be ordinal. Otherwise, the statistical data type is found 216 to be nominal.

If the top-level test 210 finds that there are more than twelve unique values, then a distribution test 218 is carried out to find out whether the values fit any of one or more pre-defined probability distributions.

True quantitative types that come from natural environments tend to take more natural frequencies and look more like a bell shaped curve (normal distribution) or skewed (Poisson distribution). The distribution test 218 finds whether the distribution of the positive integer values fits into either of these naturally occurring distributions. Note that the normal distribution is continuous and the Poisson distribution is discrete, however in statistics the binomial distribution (discrete) may be approximated using the normal distribution. Thus the distribution test 218 is able to find whether an attribute with integer values fits into the normal distribution or fits into the Poisson distribution.

If the values do fit one or more pre-defined probability distributions, then they are classified 220 as being quantitative values. If the values do not fit one or more pre-defined probability distributions, then they are classified 222 as being nominal values.

Returning to FIG. 6, if the test 174 finds that the stored type for the current attribute is not the positive integer type then the statistical analysis of the of the values of the current attribute is skipped.

In either case, the process continues with a test 178 to find whether the current attribute is the last of the M attributes. If not, the counter m is incremented 180, and another iteration of the outer loop of instructions (164-178) is carried out in order to find the stored type for the next attribute. If the statistical data type of all the M attributes has been resolved, the statistical data type finding step (FIG. 5: 146) ends.

It will be understood by those skilled in the art that identifying the different statistical data types in the network operational data enables specialised statistical methods to be selectively applied to those attributes of the data for which such specialised statistical methods are applicable and provide meaningful results.

In the present example, once the data type/statistical data type for each attribute is identified, the network coordinator then calculates 148, for each pair of records in the block of records, a measure of the similarity between the two records.

The similarity measure is a weighted sum of the similarities of the values in each attribute of the two records. For each attribute, the similarity is calculated in a manner which depends upon the statistical data type found for that attribute in the previous step 146.

The overall similarity between two records is calculated in accordance with the equation:

$$Sim(a, b) = \frac{\sum_{i=1}^{M} sim_i(a_i, b_i)}{M} \quad \text{Equation 1}$$

The calculation of $sim_i(a_i, b_i)$ depends on whether the ith attribute of the record has been categorised as nominal, ordinal or quantitative.

When an attribute has been found to be nominal, then the similarity is either one if the two values are the same or zero if they are different.

$$sim(a_i, b_i)_{nominal} = \begin{cases} 1, & a_i = b_i \\ 0, & a_i \neq b_i \end{cases} \quad \text{Equation 2}$$

When the attribute is ordinal or quantitative, the similarity calculation proceeds in two steps.

In a first step, the distance between the values is calculated, and in a second step, the calculated distance is converted into a similarity.

In the case of ordinal or quantitative attributes, the distance is calculated as the absolute numerical difference between the two values, divided by the range of values calculated as the difference between the maximum and minimum values given for the current attribute in the current batch of data items:

$$d = \frac{|a_i - b_i|}{\max - \min} \quad \text{Equation 3}$$

Various functions can be used to convert the distance into a similarity. Those functions are order-reversing (i.e. if a distance between a first pair of values is greater than the distance between a second pair of values then the similarity between the second pair of values is greater than the similarity between the first pair of values) and the two functions used in this embodiment produce a similarity between zero and one.

In the case of quantitative attributes, the distance is converted to a similarity in accordance with the following equation:

$$sim(d) = \frac{e^{-d} - e^{-1}}{1 - e^{-1}} \qquad \text{Equation 4}$$

where d is calculated in accordance with Equation 3 above.

In the case of ordinal attributes, the distance is converted to a similarity simply by subtracting the distance from one.

Either conversion function could be used in each case, but Equation 4 gives higher values (i.e. gives more weight) to nearly identical values. By raising the base of the exponentiations in Equation 4 (e.g. from e to 10), even more weight, relatively speaking, is given to nearly identical values.

The value similarity calculation function is extensible in that modules can be added which provide a value similarity calculation for specialist data types. For example, in the present embodiment, if the IP Address type test 252 finds that the statistical data type of the current attribute is IPv4 addresses, then the similarity between the two addresses might be found by comparing the four quadrants of the two IP addresses. For example, the similarity might depend upon the length of the match between the two IPv4 addresses, starting at the most significant bit of the address. If none of the quadrants match, then a similarity value of zero is returned. If the first quadrants match, but the second quadrants do not match, then a value of 0.5 is returned. If first and second quadrants match, but the third quadrant does not match, then a value of 0.75 is returned. If the first, second and third quadrants match, but the fourth quadrants do not match, then a value of 0.875 is returned. If the two IPv4 addresses are identical then a value of 1 will have been returned 234.

Once the similarities have been calculated for all pairs of records in the block of records, a clustering procedure 150 is carried out in order to arrange the records into clusters. Suitable clustering algorithms which can calculate clusters given similarity values for each pair of records will be known to those skilled in the art. By way of example, a density-based clustering algorithm (such as DBScan introduced by Martin Ester, Hans-peter Kriegel, Jörg Sander, Xiaowei Xu in the paper "A density-based algorithm for discovering clusters in large spatial databases with noise" AAAI Press. 1996) could be used. The algorithm can be run on an N*N matrix populated with the similarity measures calculated using Equation 1 above. Another possibility would be to use the Ordering points to identify the clustering structure (OPTICS) clustering algorithm presented in the paper "OPTICS: Ordering Points To Identify the Clustering Structure", by Mihael Ankerst, Markus M. Breunig, Hans-Peter Kriegel, and Jörg Sander in the proceedings of the 1999) ACM SIGMOD International Conference on Management of Data, ACM Press. pp. 49-60. Having calculated a set of clusters for the current block of records, the data aggregation process run by the network coordinator ends 152.

The data identifying the clusters and the assignment of each network operational data record to a cluster forms the customer network aggregate operational data (FIG. 2: 82) in the present embodiment.

As will now be explained with reference to FIG. 9, the automatic security rule engine 80 of the network coordinator 46 uses that customer network aggregate operational data in cooperating with the network security controller 118 of the customer network management node 20 in the customer network to mitigate or terminate attacks against the security of the customer network 40.

The automatic security rule engine 80 receives 230 a specimen network operational record which is known to represent a security breach or an attempted security breach. This could, for example, be record H taken from FIG. 4—i.e.:

03/01-17:50:54.07, 384, ICMP PING, 3, ICMP, 5.5.5.2, 5.5.5.3, 68

Owing to the present embodiment classifying the different fields of this record as belonging to different scales of measure, and then applying different distance measures to the different fields when comparing this record to other records, the clustering process of the present embodiment will generate customer network aggregate data which more accurately reflects the operational state of the customer network.

The automatic security rule engine 80 then identifies 232 the cluster containing the specimen record. For each of the records in the cluster, the automatic security rule engine generates 234 rules which tell firewalls at the customer network to block packets from the source IP address taken from each of the records in the cluster. Those rules will be accompanied by an expiry time.

Figure 9:
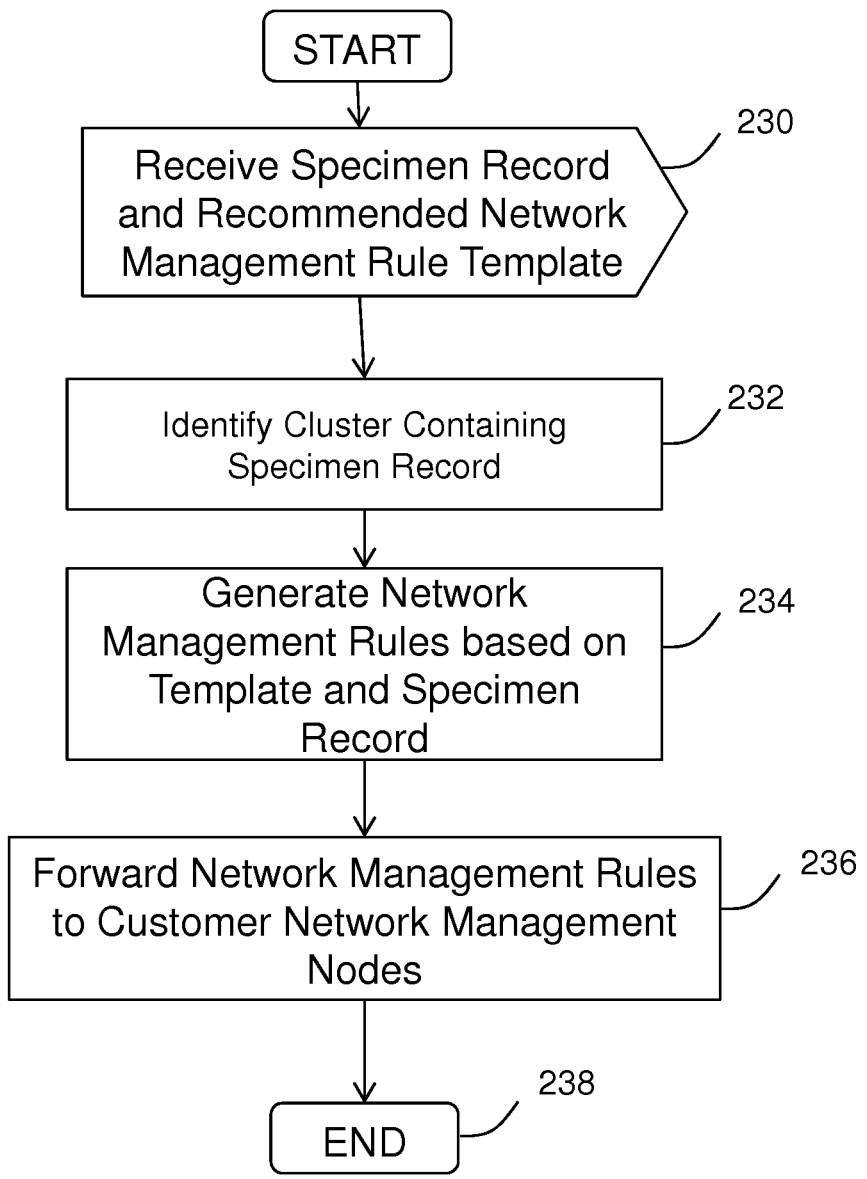
FIG. 9 shows an automatic network security control activity performed by the network coordinator and network security controller.

Having generated those rules, the automatic security rule engine 80 sends those rules to the network security controller 118 in the customer network which forwards those rules to the firewalls 12, 22 in order to mitigate or prevent the security breach or attempted security breach typified by the specimen record received at the beginning of the attack response (FIG. 9).

Figure 7:
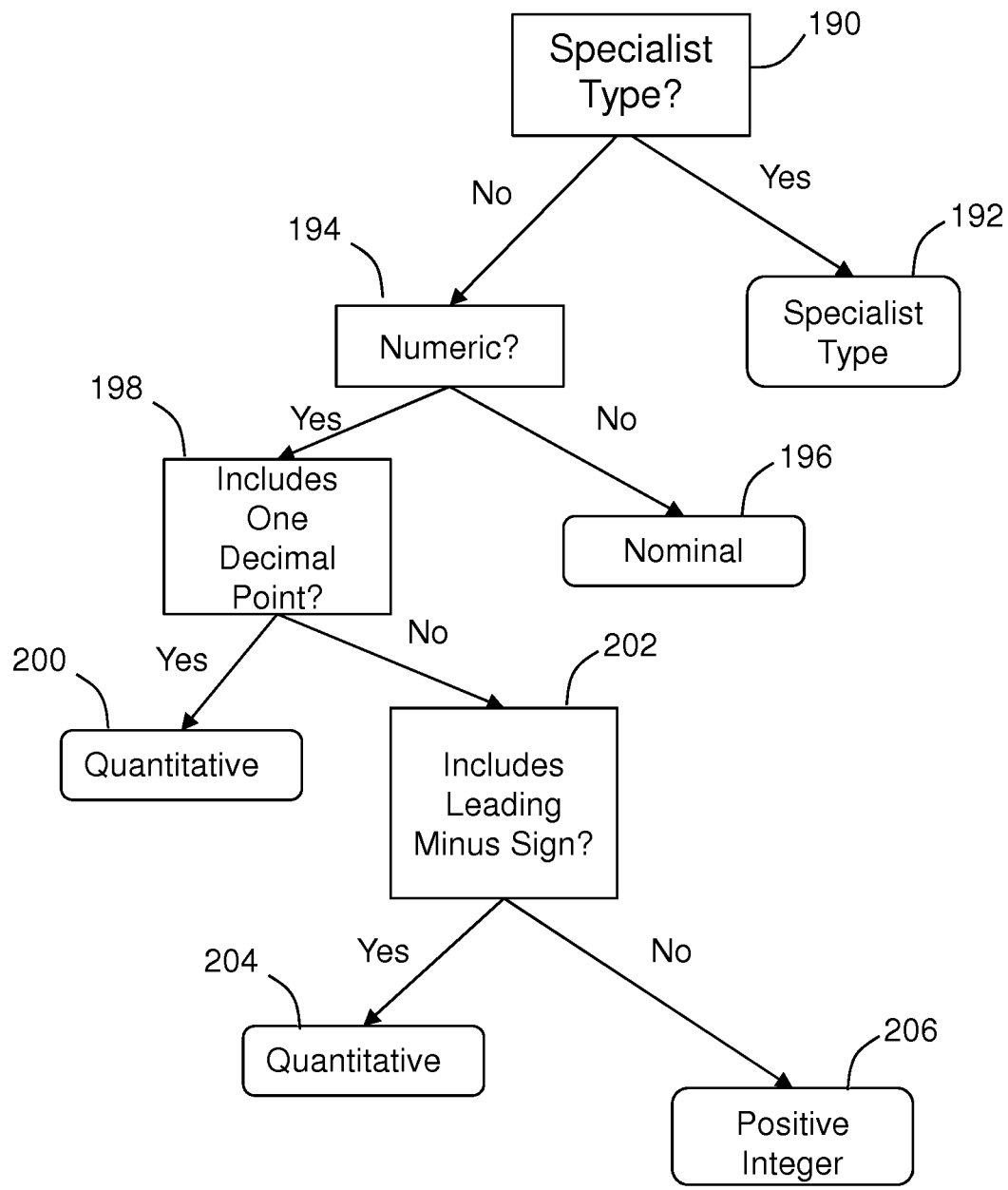
FIG. 7 is a decision tree used in a first stage of the process illustrated in FIG. 6.
Figure 8:
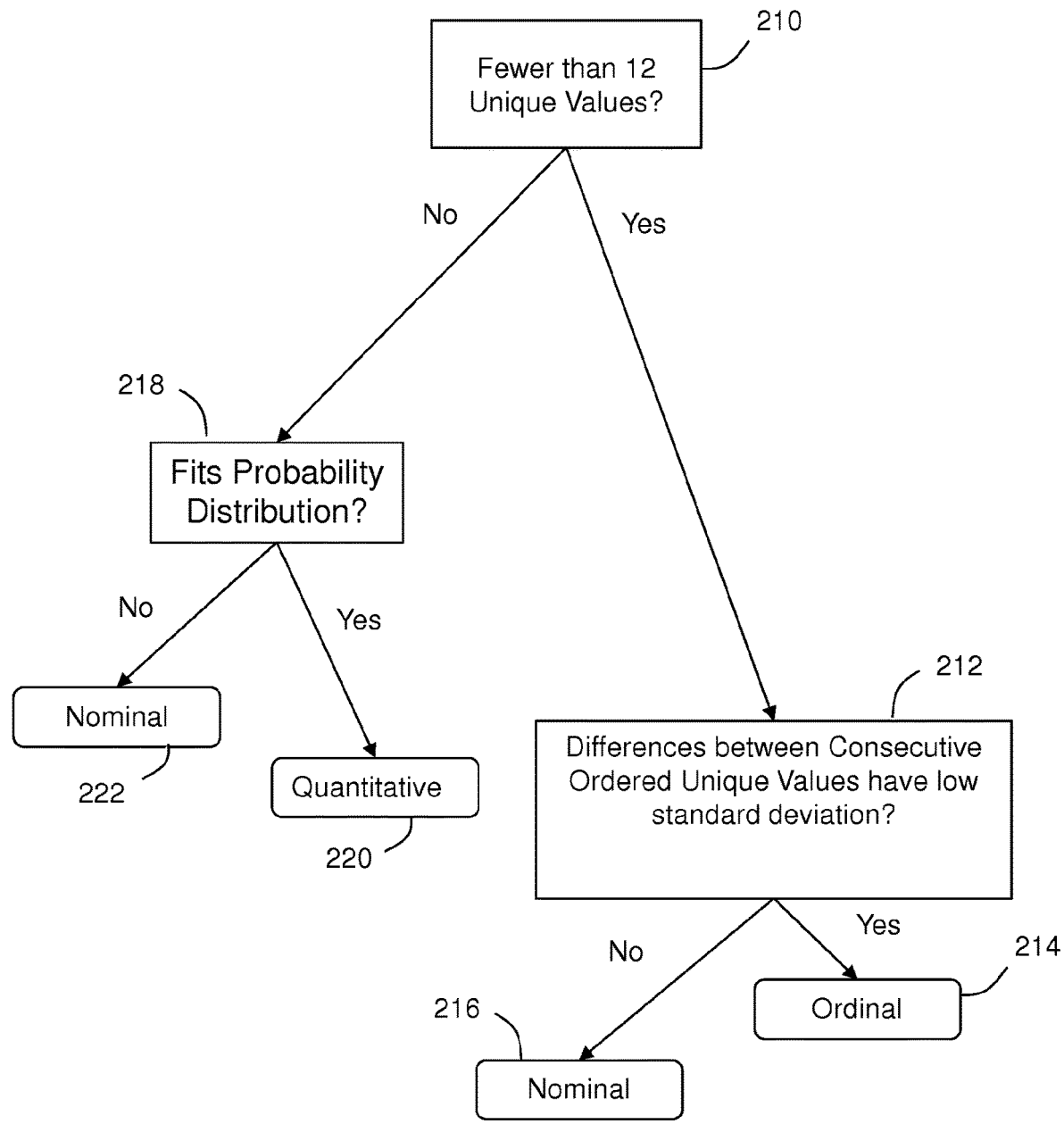
FIG. 8 shows a further decision tree used in a second stage of the process illustrated in FIG. 6.

Possible variations on the above embodiment include (this list is by no means exhaustive):

i) the customer network management node could filter (positively or negatively) messages from the various devices in the customer's network;

ii) in the above embodiment, the distribution test found whether a set of positive integer values was distributed in accordance with a binomial distribution or a Poisson distribution. In other embodiments, a different set of distributions might be considered. For example, Benford's Law could be applied to the positive integer data to see if it accorded with a log-normal distribution;

iii) in alternative embodiments, some of the tests seen in FIGS. 7 and 8 could be omitted, or replaced with other tests. Other tests might be added. For example, given a set of positive integers, the mean of the values might be found. If the mean were then less than ten, the dimension would be found to be ordinal;

iv) in the above embodiment, the identification of the data type of each attribute was used to identify and select a suitable operation for calculating similarity measures between the values given for that attribute. In general, the identification of the data type might be used to identify and select a suitable operation for subsequent processing of the values given for that attribute. Examples include finding statistical values from the data (e.g. a measure of central tendency, or a dispersion measure).

v) in the above embodiment, the network operational data was in the form of a plurality of records, each giving a single value for an attribute. However, in other embodiments, the network operational data might not be in the first normal form (1NF)—in particular, it could comprise data items, each of which gives a plurality of values for a given attribute in the data. In that case, the techniques set forth in the applicant's co-pending application (internal ref: A32615 WO) filed on the same day as this application could be used in operating the network. Alternatively, only one of the values for the given attribute could be considered—perhaps the highest, the lowest or the median, or simply a value selected at random from the set of values.

vi) in the above embodiment, every one of the values given for each attribute was considered when inferring the type of the attribute. In other embodiments, some, but not all, of the values given for each attribute might be taken into account when inferring the type of the attribute.

In summary of the above disclosure, a method of operating a communications network is disclosed. In order to manage a network, it is first necessary to establish the state the network is in. This is difficult in practice because the network operational data stored and transmitted in the network takes a myriad of forms owing to the variety of suppliers and types of network equipment. There is a need to distil that network operational data down to aggregate network operational data which can be taken to provide an indication of the state of the network which is of a manageable size, and to which network management apparatus can react by sending control commands to the network. The problem of generating aggregate network operational data is tackled by identifying the type of each attribute found in each network operational data item, and classifying the network operational data items in a manner which takes account of the identified types and thus provides network aggregate data which more accurately reflects the operational state of the network. This in turn leads to the network management apparatus controlling the network to operate in a more efficient manner than has hitherto been possible.

What is claimed is:

1. A method of operating a communications network comprising:
   receiving a plurality of network operational data items relating to the operation of said communications network, each of those network operational data items comprising one or more attributes, each attribute comprising a value for that attribute;
   automatically assigning a statistical data type to the values of one attribute according to a statistical data type classification scheme in which values are one of nominal, ordinal and quantitative by statistically analyzing a plurality of the values of the attribute;
   classifying said network operational data items using type-specific processing which depends upon whether the automatically assigned statistical data type to said attribute is nominal, ordinal or quantitative; and
   automatically operating the communications network to apply common class-specific treatment in response to network operational data items in one or more classes, wherein common class-specific treatment includes giving network elements, traffic or events represented by network operational data items assigned to a same class, a same level of priority, and/or handling them with a same countermeasure.

2. The method according to claim 1 further comprising comparing said plurality of values to one or more specialised patterns in order to find the type of the values of the attribute as being a specialist data type.

3. The method according to claim 2 further comprising receiving a specification of a specialised pattern for a specialist data type from a user.

4. The method according to claim 2 further comprising receiving a specification of one or more operations suitable for processing values matching said specialised pattern.

5. The method according to claim 1 wherein said type-specific processing comprises computing a type-specific similarity or distance measure between two of the network operational data items.

6. A non-transitory computer readable medium having stored thereon a program or suite of programs executable by a processor to perform the method of claim 1.

7. The method according to claim 1 wherein
   the attributes of the network operational data items include data comprising a sequence of bytes representing a sequence of characters; and
   the processing of the network operational data items does not rely on the network operational data items being in accordance with a predetermined schema.

8. The method according to claim 1 wherein
   automatically operating the communications network to apply the common class-specific treatment includes giving network traffic, represented by the network operational data items assigned to the same class, a same quality of service.

9. The method according to claim 1 further comprising
   determining that a network element or network traffic is malicious,
   wherein automatically operating the communications network to apply the common class-specific treatment includes handling the malicious network element network traffic with a same countermeasure.

10. A method according to claim 1, wherein statistically analyzing the plurality of the values of at least one of said attributes comprises calculating one or more collective properties of the values, the one or more collective properties being selected from the group comprising:
    i) the number of unique values found in the plurality of values of the attribute;
    ii) the frequency distribution of the values of the attribute; and
    iii) the frequency distribution of the differences between the values of the attribute when ordered.

11. The method according to claim 1, wherein the method further comprises:
    determining whether the values of the attribute are positive integers; and
    using the statistically analysis of the values of the attribute to determine whether the positive integers are nominal, ordinal or quantitative according to the statstical data type classification scheme.

12. Network control apparatus comprising:
    a receiver arranged in operation to receive a plurality of network operational data items relating to the operation of said communications network, each of those network operational data items comprising one or more attributes, each attribute comprising a value for that attribute;
    a computer system including a non-transitory computer readable medium for storing code and a computer hardware processor for executing the code such that the computer system is configured to at least perform:

a statistical data type identification to automatically assign a statistical data type to the values of one attribute according to a statistical data type classification scheme in which values are one of nominal, ordinal and quantitative by statistically analyzing a plurality of the values the attribute;

a network operational data item classification to classify said network operational data, items into a plurality of classes using type-specific processing which depends upon whether the automatically assigned statistical data type to said attribute is nominal, ordinal or quantitative; and a network control to automatically operate the communications network to apply common class-specific treatment in response to network operational data items in one or more of said plurality of classes, wherein common class-specific treatment includes giving network elements, traffic or events represented by network operational data items assigned to a same class, a same level of priority, and/or handling them with a same countermeasure.

13. The network control apparatus according to claim 12 wherein the attributes of the network operational data items include data comprising a sequence of bytes representing a sequence of characters; and the computer system is not pre-configured with data representing a predetermined schema for the network operational data items.

14. The network control apparatus according to claim 12 wherein automatically operating the communications network to apply in the network control the common class-specific treatment includes giving network traffic, represented by the network operational data items assigned to the same class, a same quality of service.

15. The network control apparatus according to claim 12 wherein the computer system is further configured to determine that a network element or network traffic is malicious, and automatically operating the communications network in the network control to apply the common class-specific treatment includes handling the malicious network element network traffic with a same countermeasure.

16. The network control apparatus according to claim 12, wherein statistical analysis of the plurality of the values of the attribute comprises calculation of one or more collective properties of the values, the one or more collective properties being selected from the group comprising:

i) the number of unique values found in the plurality of values of the attribute;

ii) the frequency distribution of the values of the attribute; and iii) the frequency distribution of the differences between the values of the attribute when ordered.

17. The network control apparatus according to claim 12, wherein said type-specific processing comprises computing a type-specific similarity or distance measure between two of the network operational data items.

18. The network control apparatus according to claim 12 wherein the computer system is further configured to perform:

a determination of whether the values of the attribute are positive integers; and a determination of whether the positive integers are nominal, ordinal or quantitative using the statistically analysis of the values of the attribute according to the statistical data type classification scheme.

19. A method of operating a communications network comprising:

receiving a plurality of network operational data items relating to the operation of said communications network, each of those network operational data items comprising one or more attributes, each attribute comprising a value for that attribute;

automatically assigning a statistical data type to the values of one attribute according to a statistical data type classification scheme in which values are one of nominal, ordinal and quantitative by statistically analyzing a plurality of the values of the attribute;

clustering said network operational data items using type-specific processing which depends upon whether the automatically assigned statistical data type to said attribute is nominal, ordinal or quantitative; and automatically operating the communications network to apply common cluster-specific treatment in response to network operational data items in one or more clusters, wherein common class-specific treatment includes giving network elements, traffic or events represented by network operational data items assigned to a same cluster, a same level of priority, and/or handling them with a same countermeasure.

20. The method according to claim 19, wherein the method further comprises:

determining whether the values of the attribute are positive integers; and using the statistically analysis of the values of the attribute to determine whether the positive integers are nominal, ordinal or quantitative according to the statistical data type classification scheme.

21. Network control apparatus comprising:

a receiver arranged in operation to receive a plurality of network operational data items relating to the operation of said communications network, each of those network operational data items comprising one or more attributes, each attribute comprising a value for that attribute;

a computer system including a non-transitory computer readable medium for storing code and a computer hardware processor for executing the code such that the computer system is configured to at least perform:

a statistical data type identification to automatically assign a statistical data type to the values of the attribute according to a statistical data type classification scheme in which values are one of nominal, ordinal and quantitative by statistically analyzing a plurality of the values of the attribute;

a network operational data item classification to cluster said network operational data items into a plurality of clusters using type-specific processing which depends upon Whether the automatically assigned statistical data type to said attribute is nominal, ordinal or quantitative; and a network control to automatically operate the communications network to apply common cluster-specific treatment in response to network operational data items in one or more of said plurality of clusters, wherein common class-specific treatment includes giving network elements, traffic or events represented by network operational data items assigned to a same cluster, a same level of priority, and/or handling them with a same countermeasure.

22. The network control apparatus according to claim 21 wherein the computer system is further configured to perform:
- a determination of whether the values of the attribute are positive integers; and
- a determination of whether the positive integers are nominal, ordinal or quantitative using the statistically analysis of the values of the attribute according to the statistical data type classification scheme.

23. A non-transitory computer readable medium having stored thereon a program or suite of programs executable by a processor to perform steps for operating a communications network, the steps comprising:
- receiving a plurality of network operational data items relating to the operation of said communications network, each of those network operational data items comprising one or more attributes, each at comprising a value for that attribute;
- automatically assigning a statistical data type to the values of one attribute according to a statistical data type classification scheme in which values are one of nominal, ordinal and quantitative by statistically analyzing a plurality of the values of the attribute;
- clustering said network operational data items using type-specific processing, which depends upon whether the automatically assigned statistical data type to said attribute is nominal, ordinal or quantitative; and
- automatically operating the communications network to apply common cluster-specific treatment in response to network operational data items in one or more clusters, wherein common class-specific treatment includes giving network elements, traffic or events represented by network operational data items assigned to a same cluster, a same level of priority, and/or handling them with a same countermeasure.

24. The non-transitory computer readable medium according to claim 23 wherein the steps further comprise:
- determining whether the values of the attribute are positive integers; and
- using the statistically analysis of the values of the attribute to determine whether the positive integers are nominal, ordinal or quantitative according to the statistical data type classification scheme.

* * * * *